May 30, 1944. H. GROBE 2,349,958
PNEUMATIC TOOL ASSEMBLY
Filed March 28, 1940
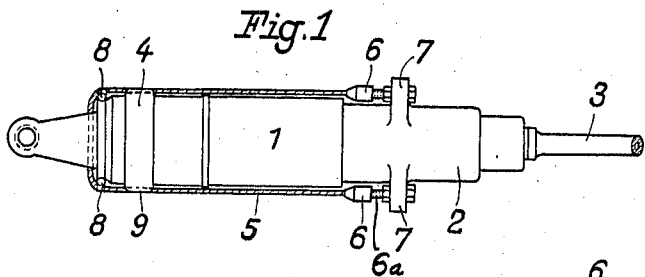
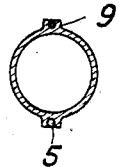
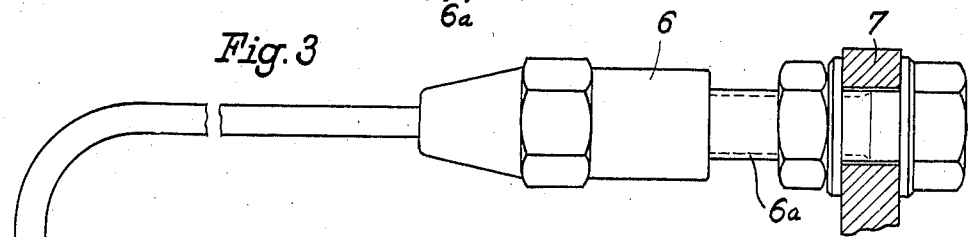
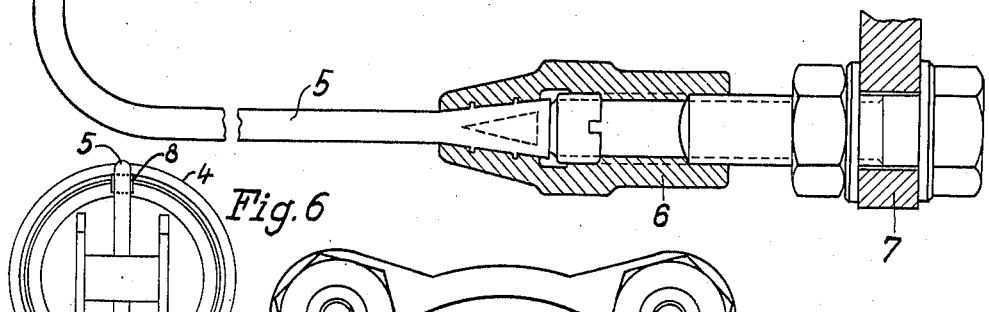
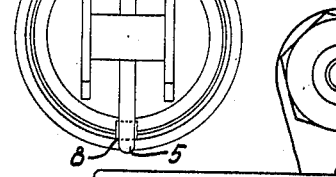
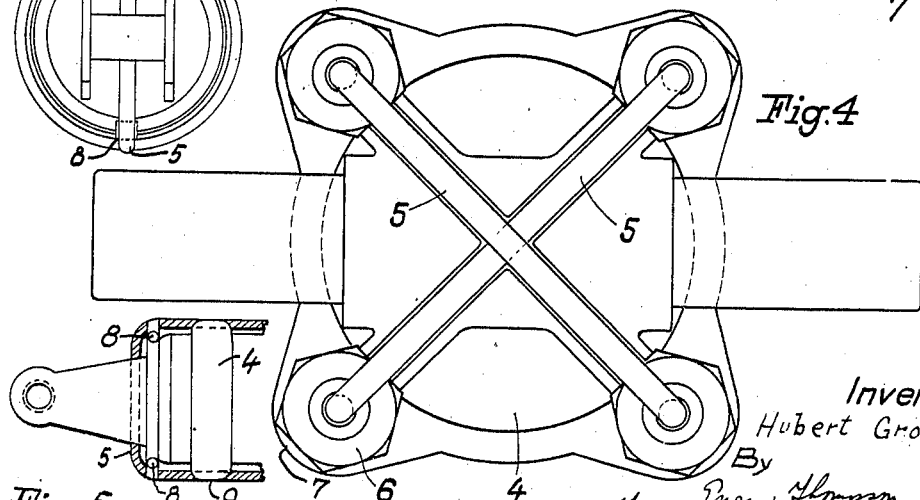
Inventor:
Hubert Grobe
By
Young, Emery & Thompson
Attorneys Patented May 30, 1944

2,349,958

UNITED STATES PATENT OFFICE 2,349,958

PNEUMATIC TOOL ASSEMBLY

Hubert Grobe, Wuppertal-Barmen, Germany; vested in the Alien Property Custodian

Application March 28, 1940, Serial No. 326,461
In Germany April 22, 1938

1 Claim. (Cl. 189—36)

The holding together of the constructional elements of pneumatic tools has been effected up to the present by screw bolts arranged on the side of the pneumatic cylinder and mounted in the front and rear cover plates of the cylinder. To enable these screw bolts uniformly to take up the vibrations occurring during service and chiefly the idle strokes of the piston, these screw bolts had to be uniformly screwed up and to remain thus; a requirement which in most cases was not fulfilled. After a short time elongations of the screw bolts occurred, so that the vibrations were irregularly transmitted to these screw bolts with resulting fracture owing to the slight elasticity of the material. Another inconvenience of these screw connections is that, owing to the elongation of individual screw bolts, the constructional elements to be connected adjust themselves by different degrees, so that jamming of sliding parts and serious damage and disturbances could occur in the pneumatic tool. It has therefore been proposed to obviate these inconveniences by the provision of springs which were coordinated to the screw bolts, or by interposition of an air bolster. It has been found however that when a spring breaks, similar inconveniences occur with jamming of the sliding parts owing to the unequal loading of the screw bolts. The springs arranged around the screw bolts and which had to be very strong made the tool wider and heavier and consequently more unhandy.

According to the invention these inconveniences are obviated thereby, that one or a certain number of wire ropes preferably twist free are used for bracing the constructional elements of the pneumatic tool. Wire ropes are less sensitive to bending stresses and, owing to their great elasticity, they do not break as easily as screw bolts. As wire ropes, for similar strength, have, compared with screw bolts, a substantially smaller diameter (for instance only $\frac{1}{10}$ of the diameter of the screw bolts) and as they may be laid closely against the cylinder wall, the weight and the width of the pneumatic tool are reduced and thereby the handling of the same is facilitated.

The bracing of the constructional elements by means of wire ropes can be effected in various manners. An especially suitable construction however is realised when the constructional elements are braced by one or several wire ropes conducted in U-shape around the body of the pneumatic tool. Especially on heavy hammers it is best, if two or more such U-shaped wire ropes are arranged crosswise or the one over the other at a corresponding angle. By the employment of such U-shaped bracing ropes, a bracing equalisation is produced automatically in the rope halves and which remains also when the wire ropes elongate. When several ropes are used, extending crosswise the one over the other on the cylinder cover, the advantage results that, even when one of the coupling nuts or ropes breaks, the other rope or ropes take up the stresses completely and uniformly.

The bracing equalisation in the ropes extending over the cylinder cover is favoured by the wire ropes being passed over rollers or similar elements especially at the bending points. When several wire ropes are extended crosswise over a cylinder cover, these rollers are arranged displaced from the central axis of the pneumatic tool or are stepped in diameter, in such a manner that the crossing, braced wire ropes are of equal length. Owing to this arrangement it is not necessary to use ropes of different lengths.

As the wire ropes are of relatively small diameter and passed closely against the cylinder walls, they may be laid completely or partly in grooves in the cylinder walls, open on the outer side, and protected in this manner against damage. The ends of the wire ropes are fixed on the cylinder by interposition of coupling nuts.

Two embodiments of the invention are illustrated by way of example in the accompanying drawing, in which Fig. 1 shows a coal picker in side elevation, with a single wire rope connection, Fig. 2 is a cross-section through the cylinder, Fig. 3 shows the bracing rope on larger scale, Fig. 4 shows in top plan view the rear cylinder cover on larger scale, of a similar machine employing two wire ropes, Fig. 5 is a fragmentary detail on an enlarged scale, of the left end of the device shown in Fig. 3, Fig. 6 is a rear end elevation of the device shown in Fig. 3.

The pneumatic cylinder 1 of the pneumatic coal picker ends on the front side in a picker part 2 which has the hole through which the chisel 3 extends and on the rear side in a cover 4 with handle. The parts 2 and 4 are fixed on the cylinder ends and all parts are held together by a twist free wire rope 5. The ends of the wire rope are fixed by means of coupling sleeves 6 to fastening stub bolts 6a extending through holes in projections 7 of the front part 2 of the picker, and conducted in U-shape over the rear cylinder cover 4. The wire rope 5 extends on the edge of the cover 4 over rollers 8, so that the bracing of the rope on both cylinder sides can be equalised at any time without the necessity of overcoming large friction resistances. As shown in Figs. 1 and 2 the rope 5 may be laid in grooves 9 in the side wall of the cylinder so that the rope is protected against damage.

Fig. 4 shows the bracing of the constructional cylinder elements by means of two wire ropes 5, extending crosswise over the rear cover of the cylinder. Rollers such as the rollers shown in Fig. 1 may be provided on the cover, if desired. The bracing ropes 5 are of equal length which may be achieved by suitably locating the two projections 7 of the front cover 2 of the cylinder or by varying the diameters of the rollers when rollers are used. If in this form of construction one of the ropes 5 should break, the constructional elements are still held together by the other rope. As this rope extends transversely over the center of the cylinder cover the forces to be taken up are uniformly distributed on both sides of the rope, so that bending of the cylinder covers by forces acting on one side only and thereby damages by jamming of the sliding elements cannot occur.

I claim:

A pneumatic tool comprising a plurality of constructional elements subjected to separating forces in the operation of the tool, means including a wire rope passing in U-form around one of said elements and connected at its ends to another of said elements said means forming the sole connections of said elements to each other against said separating forces, and rollers arranged between the bends of the U-form wire rope and the element around which it passes.

HUBERT GROBE.